United States Patent
Tamburrini et al.

(10) Patent No.: US 9,087,251 B2
(45) Date of Patent: *Jul. 21, 2015

(54) DATA READER WITH MULTIPLE MODES OF OPERATION

(71) Applicant: Datalogic ADC, Inc., Eugene, OR (US)

(72) Inventors: Thomas E. Tamburrini, Eugene, OR (US); Nicolas H. Tabet, Eugene, OR (US); Jon P. C. Williams, Eugene, OR (US); David P. Ingles, Eugene, OR (US); Michele Benedetti, Calderara di Reno (IT)

(73) Assignee: DATALOGIC ADC, INC., Eugene, OR (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/973,903

(22) Filed: Aug. 22, 2013

(65) Prior Publication Data

US 2013/0341406 A1 Dec. 26, 2013

Related U.S. Application Data

(63) Continuation of application No. 13/117,563, filed on May 27, 2011, now Pat. No. 8,517,273.

(60) Provisional application No. 61/349,795, filed on May 28, 2010.

(51) Int. Cl.
*G06K 7/10* (2006.01)
*G06K 9/22* (2006.01)

(52) U.S. Cl.
CPC ............ *G06K 7/109* (2013.01); *G06K 7/10881* (2013.01); *G06K 9/228* (2013.01)

(58) Field of Classification Search
CPC .................. G06K 2207/1011; G06K 7/10722; G06K 7/10811; G06K 7/10881; G06K 7/14; G06K 9/32; G06K 9/6202; G06K 7/10584; G06K 7/10683; G06K 7/10693; G06K 7/109; G06K 2207/1016; G06K 2207/1018; G06K 7/10
USPC ............ 235/462.01–462.45, 472.01–472.03, 235/454, 455, 470
See application file for complete search history.

(56) References Cited

U.S. PATENT DOCUMENTS 4,560,862 A 12/1985 Eastman et al.
5,132,523 A 7/1992 Bassett (Continued)

FOREIGN PATENT DOCUMENTS

EP 0944017 A2 9/1999
WO WO 97/28512 A1 8/1997
WO WO 2010-059410 5/2010

OTHER PUBLICATIONS

Extended European Search Report for European Application No. 11787495.8 mailed Sep. 26, 2014, 6 pages.

(Continued)

*Primary Examiner* — Thien M Le
(74) *Attorney, Agent, or Firm* — Stoel Rives LLP

(57) ABSTRACT

Data reading systems and methods for operating data readers such as optical code readers and RFID readers. Certain preferred embodiments are directed to data readers having improved operation features for switching between various operation modes such as, for example, switching between handheld/portable mode and fixed mode using an on board inertial sensor such as an accelerometer or gyroscopic device capable of sensing various movements, motions, and/or orientations.

13 Claims, 9 Drawing Sheets

(56) References Cited

U.S. PATENT DOCUMENTS

| | | | |
|---|---|---|---|
| 5,214,270 A | 5/1993 | Rando | |
| 5,612,530 A | 3/1997 | Sanders et al. | |
| 5,691,528 A | 11/1997 | Wyatt et al. | |
| 5,869,840 A | 2/1999 | Helton | |
| 5,874,722 A | 2/1999 | Rando et al. | |
| 6,129,282 A | 10/2000 | Reddersen | |
| 6,164,546 A | 12/2000 | Kumagai et al. | |
| 6,216,953 B1 | 4/2001 | Kumagai et al. | |
| 6,283,375 B1 | 9/2001 | Wilz, Sr. et al. | |
| 6,410,931 B1 | 6/2002 | Dvorkis et al. | |
| 6,435,413 B1 | 8/2002 | Kumagai et al. | |
| 6,499,664 B2 | 12/2002 | Knowles et al. | |
| 6,719,201 B2 | 4/2004 | Tamburrini et al. | |
| 6,811,086 B1 | 11/2004 | Kumagai et al. | |
| 6,857,572 B2 | 2/2005 | Martin et al. | |
| 6,860,426 B2 | 3/2005 | Kumagai et al. | |
| 6,899,274 B2 | 5/2005 | Kumagai et al. | |
| 7,048,188 B2 | 5/2006 | Kumagai et al. | |
| 7,051,940 B2 | 5/2006 | Tamburrini et al. | |
| 7,077,327 B1 | 7/2006 | Knowles et al. | |
| 7,124,950 B2 | 10/2006 | Blake et al. | |
| 7,128,266 B2 | 10/2006 | Zhu et al. | |
| 7,185,817 B2 | 3/2007 | Zhu et al. | |
| 7,222,794 B2 | 5/2007 | Kumagai et al. | |
| 7,243,850 B2 | 7/2007 | Tamburrini et al. | |
| 7,270,272 B2 | 9/2007 | Zhu et al. | |
| 7,273,180 B2 | 9/2007 | Zhu et al. | |
| 7,321,305 B2 * | 1/2008 | Gollu | 340/572.1 |
| 7,490,770 B2 | 2/2009 | Shearin | |
| 7,523,867 B2 | 4/2009 | Martin et al. | |
| 7,562,817 B2 | 7/2009 | McQueen et al. | |
| 7,848,698 B2 * | 12/2010 | Batcheller et al. | 434/2 |
| 8,687,104 B2 * | 4/2014 | Penov et al. | 348/333.03 |
| 8,838,273 B2 * | 9/2014 | Hvass et al. | 700/253 |
| 2006/0032919 A1 | 2/2006 | Shearin | |
| 2006/0081712 A1 | 4/2006 | Rudeen et al. | |
| 2006/0220791 A1 | 10/2006 | Willins et al. | |
| 2007/0284448 A1 | 12/2007 | Wang | |
| 2009/0001171 A1 | 1/2009 | Carlson et al. | |
| 2009/0108076 A1 | 4/2009 | Barkan et al. | |
| 2009/0294541 A1 | 12/2009 | Nunnink | |
| 2010/0078479 A1 | 4/2010 | Epshteyn | |
| 2012/0012656 A1 | 1/2012 | Wang | |
| 2012/0058457 A1 * | 3/2012 | Savitsky | 434/262 |
| 2013/0258117 A1 * | 10/2013 | Penov et al. | 348/207.1 |
| 2014/0178841 A1 * | 6/2014 | Carter | 434/19 |
| 2014/0211067 A1 * | 7/2014 | Penov et al. | 348/333.03 |

OTHER PUBLICATIONS

Tamburrini et al., abandoned U.S. Appl. No. 12/505,400; reissue of U.S. 7,243,850.

NCR RealScan 7883 Installation and Owner Guide Release H (2004) p. 23. Downloaded Jun. 23, 2011 from http://www.wocode.cn/download/ncr%20realscan%207883%20installation%20and%20owne%20guide.pdf.

International Searching Authority, International Patent Application No. PCT/US2011/038335, International Search Report and Written Opinion, Dec. 20, 2011, 9 pp.

First Office Action for Chinese Application No. 201180026461.0 issued Nov. 19, 2014.

* cited by examiner

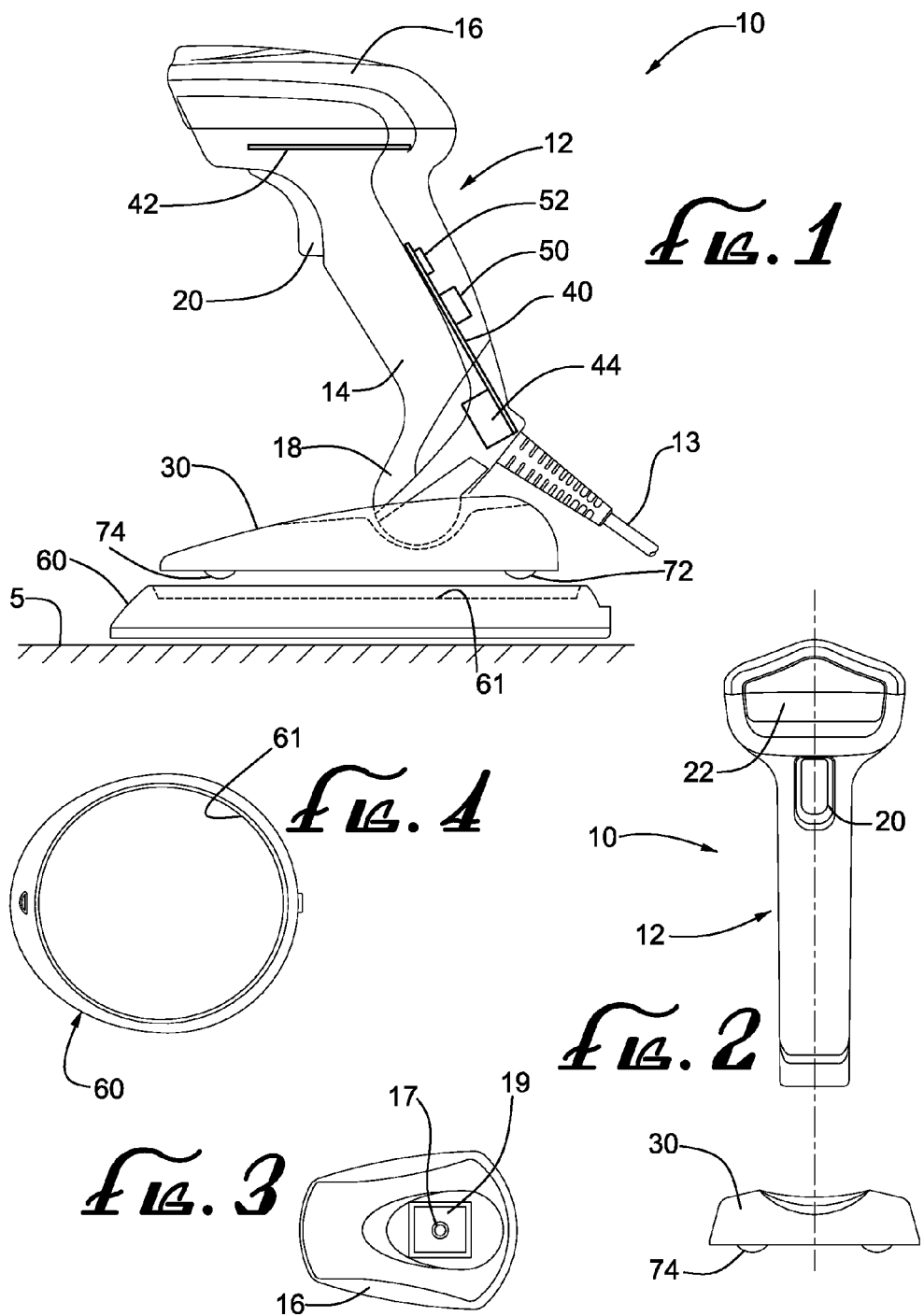

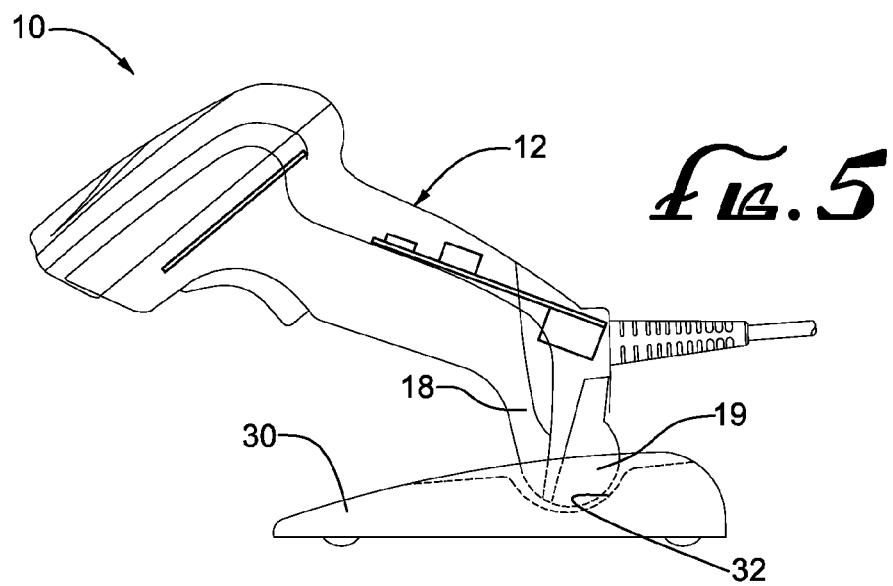
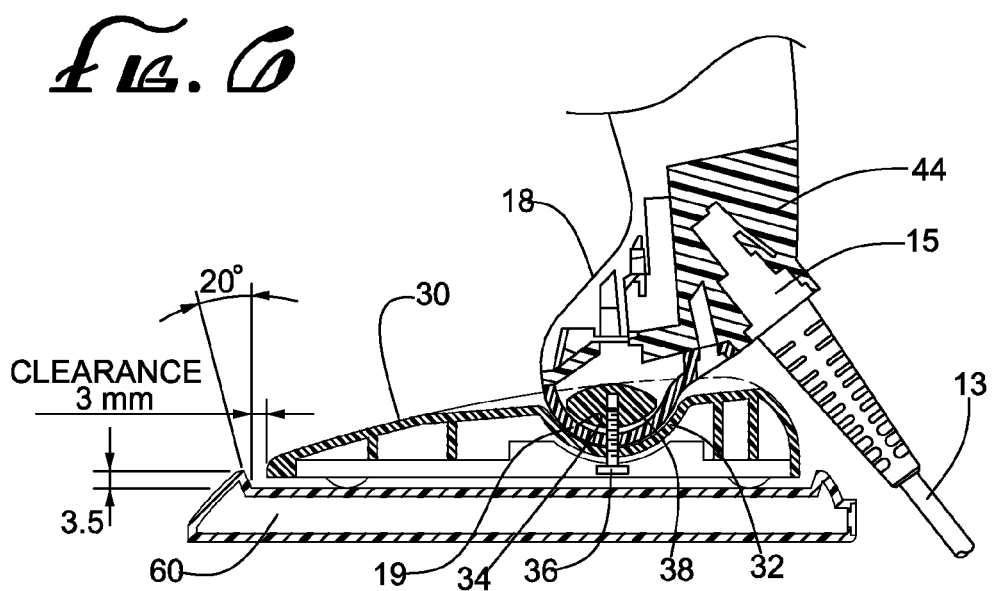

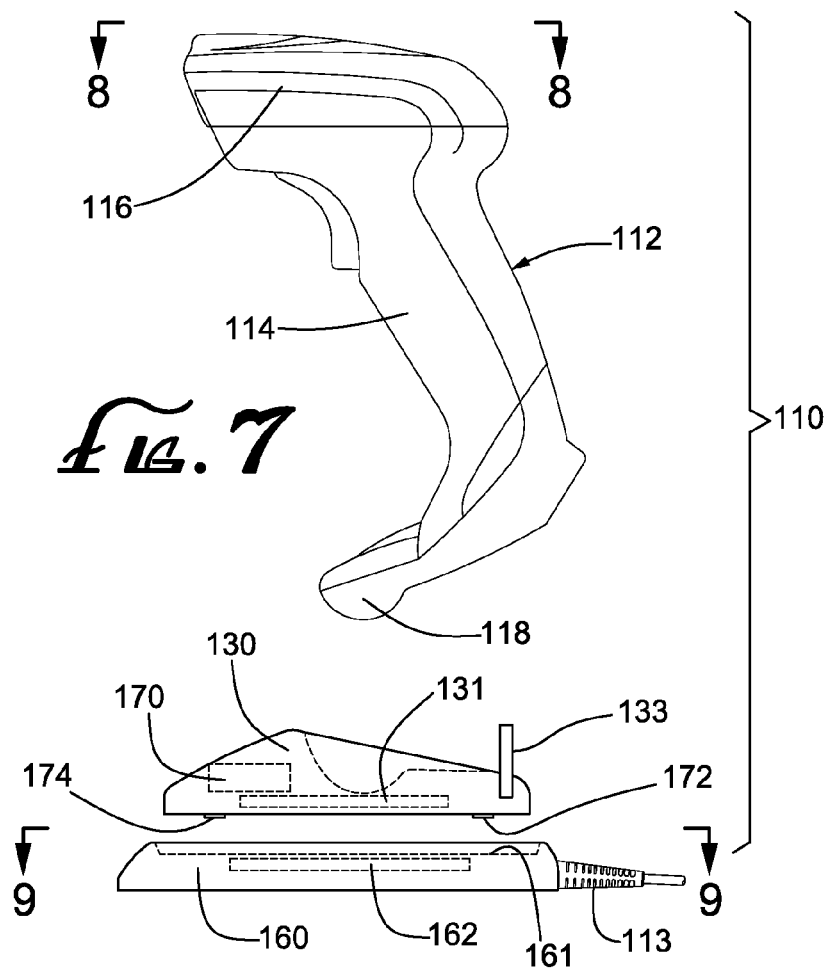
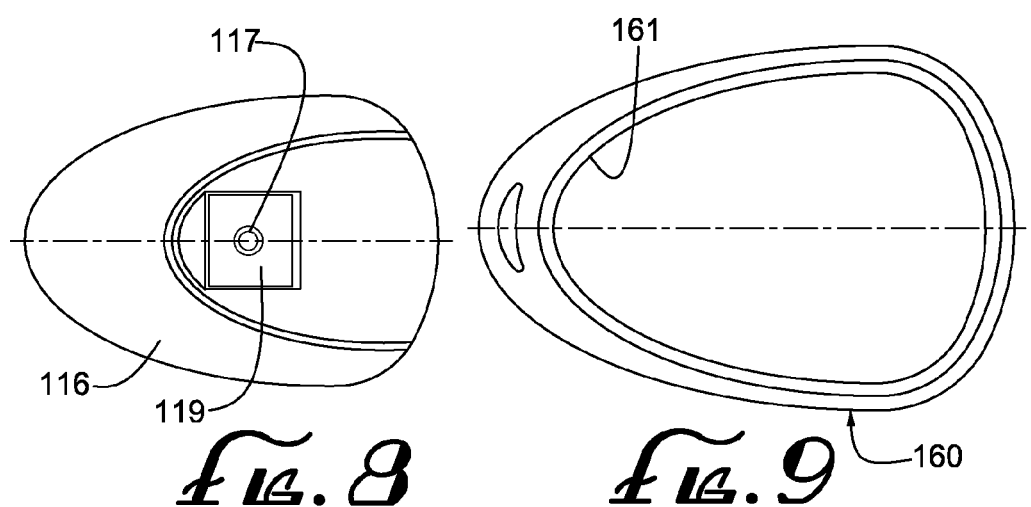

DATA READER WITH MULTIPLE MODES OF OPERATION

RELATED APPLICATION DATA

This application is a continuation of U.S. application Ser. No. 13/117,563 filed May 27, 2011 now U.S. Pat. No. 8,517,273, which claims priority to U.S. provisional application No. 61/349,795 filed May 28, 2010, these applications hereby incorporated by reference.

BACKGROUND

The field of the present disclosure relates to data readers such as scanners, optical code reading devices, and electronic tag (e.g., Radio Frequency Identification "RFID") readers. In the following description, the focus is on barcode reading, but the present disclosure is generally applicable to other types of symbol reading, object identification, or electronic tag reading.

A barcode label comprises a series of parallel dark bars of varying widths with intervening light spaces, also of varying widths. The information encoded in the barcode is represented by the specific sequence of bar and space widths, the precise nature of this representation depending on which particular barcode symbology is in use. Typical methods for reading barcodes comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths which is presented to an electronic decoding apparatus for decoding.

Bar codes are just one example of the many types of optical codes in use today. The most common bar codes are one-dimensional or linear optical codes, such as the UPC code or Code 39 bar code, where the information is encoded in one direction—the direction perpendicular to the bars and spaces. Higher-dimensional optical codes, such as, two-dimensional matrix codes (e.g., MaxiCode) or stacked codes (e.g., PDF 417), which are also sometimes referred to as "bar codes," are also used for various purposes.

One common type of barcode reader is a spot scanner in which a source of illumination is moved (i.e., scanned) across the barcode while a photodetector monitors the reflected or backscattered light. The illumination source in a spot scanner is typically a laser, but may comprise a coherent light source, such as a laser or laser diode, or a non-coherent light source, such as a light emitting diode (LED). A laser illumination source may offer advantages of higher intensity illumination which may allow barcodes to be read over a larger range of distances from the barcode scanner, i.e., having a large depth of field, and under a wider range of background illumination conditions.

The reading spot of the scanner may be manually moved across the barcode, this type of reader being typically referred to as a wand. Alternately, the spot may be automatically moved or scanned across the barcode in a controlled pattern. The scanning mechanism may comprise a rotating mirror facet wheel, an oscillating mirror, or other suitable mechanism for pivotally moving/scanning the illumination beam. The path followed by the scanned illumination beam is referred to as a scan line. Typically, an individual scan line must extend across the barcode for the barcode to be successfully read unless specialized piecing/assembly software, known as stitching, or electronics are utilized to combine partial scan segments. In addition to the scan engine, barcode scanner may also employ a set of scan pattern generating optics such as pattern mirrors to produce a multiplicity of scan lines in various directions from the scanner and at varying orientations, thereby allowing barcodes to be read over a large angular field of view and over a wide range of orientations, that is a multi-dimensional scan pattern.

Another type of data reader is the imaging reader such as a CCD (charge coupled device) or CMOS (complimentary metal oxide semiconductor) in which an entire line of the barcode image or a two-dimensional image of a scan region is focused onto a detector array. The imaging reader typically includes a light source to illuminate the barcode to provide the required signal response. For the purpose of this description, the word "scanner" may be referred to data readers both of the spot scanner type and the imaging type.

Yet another type of data reader is an electronic tag reader such as an RFID reader. The RFID reader has an antenna that emits radio waves and the RFID tag responds by sending back its data which in turn is captured by a receiver in the reader.

In relation to data reader operation/function, one way in classifying how data readers are operated is via the two modes: (1) handheld (or portable) and (2) fixed (or hands-free). In the fixed or hands-free mode of operation, the data reader is fixed/stationary while the barcoded objects or other objects to be read are passed through or held within a larger read volume. In the portable or handheld mode of operation, the data reader is moved or otherwise aimed at the barcode label or electronic tag to be read.

In a combined function data reader which is to be used in both fixed and handheld modes of operation, it is desirable for the combined function data reader to have different functional characteristics when operating either of the fixed or handheld modes. Previously combined handheld/fixed data readers have employed various mechanisms for detecting when the reader is being switched between handheld and fixed modes of operation. For example, in a fixed mode of operation, a barcode reader may generate an omnidirectional scan pattern projected into a scan field but when picked up and used in a handheld mode, switches to a single line laser scan pattern by operation of manually actuable trigger on the reader housing.

Various methods/systems for switching the data reader as between modes have been proposed. For example, the base of the unit may include a mechanical or magnetic bottom switch, such as a contact or pressure switch, that detects/actuates when the reader is lifted off of a surface or removed from a stand. In another example, such as U.S. Pat. No. 4,766,297, a scanner may include an optical sensor that senses when the scanner is removed from the stand and then switches to hand-held mode. In yet another example, U.S. Pat. No. 7,243,850 discloses, among other things, a combination handheld/fixed scanner that includes a motion sensor which senses that the unit has been picked up by the operator, and when the sensor detects motion, it is switched from the fixed mode of operation to the handheld mode of operation.

Thus though there have been various methods proposed for switching the data reader as between modes, the present inventors have determined that improved methodologies are desirable.

SUMMARY

The present invention is directed to data reading systems and methods for controlling or operating data readers. Certain preferred embodiments are directed to data readers having improved operation features for switching between various operation modes such as, for example, switching between handheld/portable mode and fixed mode or changing various operational characteristics of the reader.

Additional aspects and advantages will be apparent from the following detailed description of preferred embodiments, which proceeds with reference to the accompanying drawings.

BRIEF DESCRIPTION OF THE DRAWINGS

FIG. 1 is a left side elevation view of a data reader according to a first embodiment, and also showing a stand element.

FIG. 2 is a front side elevation view of the data reader of FIG. 1.

FIG. 3 is a top side plan view of the base of the data reader of FIGS. 1-2.

FIG. 4 is a top side plan view of the base tray section of the system of FIG. 1.

FIG. 5 is a left side elevation view of the data reader of FIGS. 1-2 with the reader in a downwardly tilted orientation.

FIG. 6 is cross sectional view of the base and base tray section of the data reader of FIGS. 1-2, on an enlarged scale.

FIG. 7 is a left side elevation view of a data reader according to an alternate embodiment and also showing a base and base tray stand element.

FIG. 8 is a top side plan view of the base of the data reader of FIG. 7.

FIG. 9 is a top side plan view of the base tray stand section of the system of FIG. 7.

DETAILED DESCRIPTION OF PREFERRED EMBODIMENTS

Figure 10:
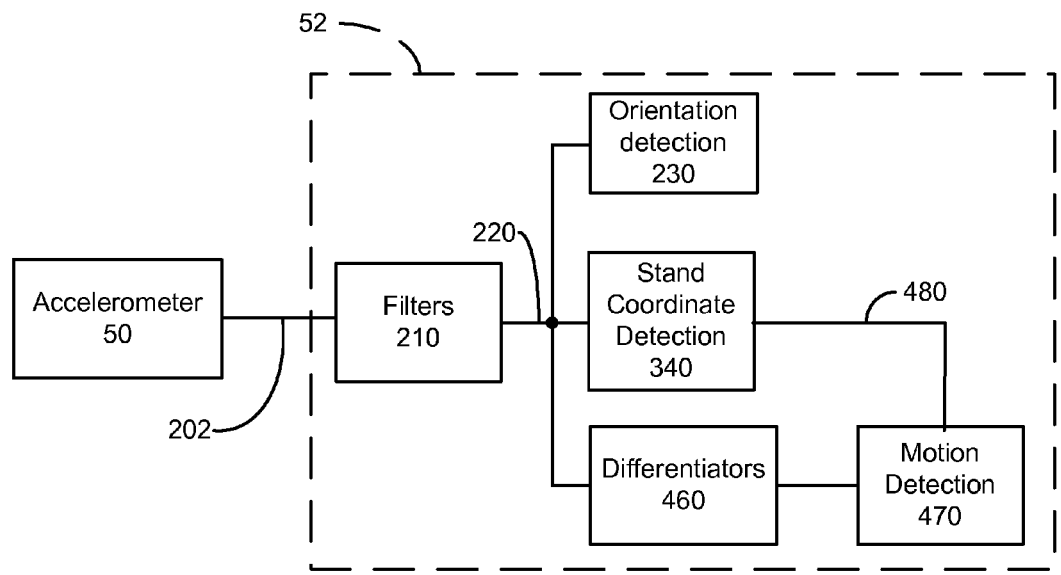
FIG. 10 is a block diagram representing various processing modules of a microprocessor of the data reader of FIGS. 1-6.

Preferred embodiments will now be described with reference to the drawings.

FIGS. 1-6 illustrate a data reader system 10 including a housing unit 12 with a central hand-grip section 14, an upper head section 16, and a lower section 18. The housing unit 12 includes an optional trigger 20 on a front side of the housing 12. The reader 10 includes a base 30 which serves as a platform for supporting the reader 10 on a flat surface such as a countertop 5 (which is typically horizontal) or a wall (which is typically vertical). The base unit 30 includes an optional base tray 60. The base tray 60 may optionally be secured or temporarily mounted to the countertop surface 5. The base tray 60 includes an indented upper section 61 into which the base 30 may nest. The base 30 may be provided with bottom feet 72, 74 composed of a suitable material such as rubber for providing a non-sliding contact to the base tray 60 or countertop. The base 30 is preferably weighted (with ballast) to provide a solid/balanced resting platform for the unit 10 either on the counter surface 5 or within the base tray 60. The lower section 18 may optionally be detachably removable from the base 30 when being operated in the handheld mode. In another configuration, as illustrated in FIG. 6, the unit may include a built-in stand whereby the housing 12 remains connected to the base 30 when operated in the handheld mode (the base 30 operating as a built-in stand section).

The connection between the housing 12 and the base 30 preferably includes a pivoting mechanism as described below that allows tilting of the housing 12 relative to the base 30. FIGS. 1-2 illustrate the reader 10 in a more vertical orientation with the front window 22 facing generally sidewardly such as for reading a barcode on a vertical side of an item. FIG. 5 illustrates the reader 10 tilted downwardly such that the window 22 is oriented in a downwardly facing direction suitable for reading a barcode on a top side of an item.

The reader 10 is shown having a generally gun or pistol-shaped housing 12 with a trigger-finger actuated trigger 20 positioned at an appropriate forward position. Alternately, the housing may be of other shape configurations such as box-shaped with one or more windows or other configurations such as the data readers described in U.S. Pat. No. 7,243,850, hereby incorporated by reference, the housing preferably equipped with a suitable actuator button(s).

The reader 10 may be linked to a host via a cable 13 or, as will be described below in greater detail, it may be linked via a wireless connection such as RF (e.g., Bluetooth, Zigbee), IR or microwave. Alternately, the cable 13 may be connected to the base section 30, particularly suitable for embodiments wherein the base section 30 remains connected to the housing 12 in the handheld mode.

The reader is provided with one or more printed circuit boards 40, 42 disposed in the housing 12, the PCBs 40, 42 containing the various unit electronics. The lower PCB 40 is illustrated with a cable connector 44 for providing a cable plug connection 15 (see FIG. 6), such as an RJ45 connector, for example, for the cable 13. The PCBs may be disposed in any suitable location, including (a) in the head section 16 (such as PCB 42); in the handle section 14 (such as PCB 40); the foot section 18; or in the base section 30.

FIG. 6 illustrates an example pivoting mechanism operable between the base 30 and the foot section 18 of the housing 12. The outward end of the foot section 18 has a rounded male cylindrical section 19 that nests into a corresponding cylindrical socket section 32 of the base 30. The male cylindrical section 19 is secured within the cylindrical socket section 32 via a pin 36 and bushing 38. The pin 36 and bushing 38 traverse along a transverse slot 34 in the cylindrical section 19 to allow pivoting of the housing section 12.

Other suitable connection mechanisms may be employed. For example, a magnetic coupling mechanism may secure the cylindrical section to the socket section, the magnetic force maintaining connection between the elements yet allow pivoting or even separation. In another arrangement, the lower section 19 may comprise a ball section that nests within the socket section 32, the ball snap-fitting into the socket held in place by a friction fit, yet allow pivoting and even separation.

FIGS. 7-9 illustrate an alternate configuration for a data reader 110. The data reader 110 is similar to the reader 10 of the previous embodiment. The reader 110 includes a housing unit 112 having a handle section 114, a head or upper section 116 and a lower or foot section 118. Though illustrated in an exploded view, the lower section 118 is pivotally connected to the base section 130 in similar fashion as the prior embodiment. The base 118 which serves as a platform for supporting the reader housing 112 onto a flat surface such as a countertop 5 or a wall. The base unit 30 includes an optional base tray 160. The base tray 160 may be secured or temporarily mounted to the surface 5. The base tray 160 includes an indented upper section 161 into which the base 130 may nest. The base 130 is weighted (with ballast) to provide a solid/balanced resting platform for the unit 110 either on the counter surface 5 or within the base tray 160. In a preferred configuration, the unit may include a built-in stand whereby the housing 112 remains connected to the base 130 when operated in the handheld mode. Other details of the reader 110, such as the pivoting connection mechanism, are similar to that described above with respect to the reader 10 of FIGS. 1-6 above and are not repeated for brevity.

The following description for reader operation will be described with reference to the embodiment of FIGS. 1-6, but it is understood that the description would be equally applicable to the other embodiment of FIGS. 7-9.

For automatic operation, the reader 10 is equipped with an inertial sensor 50, preferably mounted on one of the PCBs such as PCB 40 as illustrated in FIG. 1, the inertial sensor 50 being operative to sense that the reader 10 is in motion and thus has been picked up by the operator. In its basic form, the reader will switch between operating in the fixed mode and the handheld mode automatically based on a signal (one or more signals) from the inertial sensor 50. For example, when the inertial sensor 50 detects motion of the unit, the reader switches from the fixed mode to handheld mode. Alternately (or in addition), when in the handheld mode and the inertial sensor 50 detects no motion for a given length of time, the reader switches to the fixed mode. The inertial sensor may comprise any suitable inertial sensing device such as a gyroscopic device or an accelerometer or combinations thereof such as an inertial measurement unit (IMU). A gyroscopic device, for example, is particularly effective for sensing tilt or rotation of an object. An accelerometer is particularly effective in sensing directional accelerations, orientation relative to gravity, but is also effective in other aspects as will be described below. For ease of description, the following embodiments will be described with respect to an accelerometer, but other inertial sensing mechanisms or combination of mechanisms may be used in place thereof.

An example inertial sensor device may comprise an accelerometer 50 (comprising one or more acceleration sensors) that may be operative to detect not only motion and/or orientation relative to gravity but is preferably a 3-axis accelerometer capable of detecting accelerations/motion in all three directions (x, y, z) as well as the orientation of the reader 10. Alternately, the accelerometer 50 may be a 2-axis unit. In a preferred configuration, the accelerometer 50 is constructed to be capable of detecting one or more taps (also called pulses or clicks) applied to the reader 10. The accelerometer 50 may utilize one or more of different methods to detect movement and orientation of the reader 10. In one example, the accelerometer 50 includes a micro electro-mechanical system (MEMS) in which deflection of a proof mass from a neutral position is measured (e.g., capacitance is measured, or a piezoresistor is used to detect spring deformation) to thereby detect movement and/or orientation. The accelerometer 50 communicates with a controller, such as a microprocessor 52 shown disposed on the PCB 40. The microprocessor 52 serves to control operation of the reader 10 in response to signals from the accelerometer 50. One example accelerometer 50 is a 3-axis sensor, such as for example (1) the model MMA7455L available from Freescale Semiconductor Inc. of Austin, Tex., (2) the model LIS35DE available from ST Microelectronics of Geneva, Switzerland, or (3) the model ADXL345 available from Analog Devices, Inc. of Norwood, Mass.

Another function of the accelerometer may be to detect when the reader is in free fall. The purpose of detecting free fall is so that the reader can prepare delicate systems in the reader for the impending impact at the end of the fall. In one example, in response to detecting motion of the data reader in free fall, the data reader is switched into a protective mode in preparation for impending impact. An object in free fall is detected by the absolute values X, Y and Z axis acceleration being less than a preset threshold. For example, if the acceleration detected by all three axes is less than +/−0.5 g then the data reader may be considered to be in free fall and thus switch to protective mode.

In the protective mode, the data reader can adjust certain operating parameters or take other suitable action to protect system components. For example, a protective mode may comprise one or more of the following: (1) the laser driver circuit (and/or other shock-sensitive circuits) can be disabled or placed in a protective mode before impact to prevent any power spikes on the laser that could occur from contact intermittencies during impact; (2) the dither mirror of a scanner mechanism can be braked or otherwise secured before impact to protect the dither spring from over-stressing or other mechanical damage; (3) the trigger may be disabled to prevent false triggering upon impact FIG. 10 is a block diagram, according to one embodiment, of the accelerometer 50 and various procession modules of the microprocessor 52 that may be implemented to provide a number of different functions, modes or capabilities for the reader 10 based upon motion and/or orientation of the reader 10. These functions, modes or capabilities are described in more detail below. The accelerometer 50 supplies a signal 202 representing x, y, and z components of an acceleration vector to the microprocessor 52. The microprocessor includes one or more low-pass filters 210 that filter the x, y, and z components to thereby provide a relatively clean, lower bandwidth signal 220 for other processing modules. In one example, the low-pass filters 210 are moving average filters.

Figure 11:
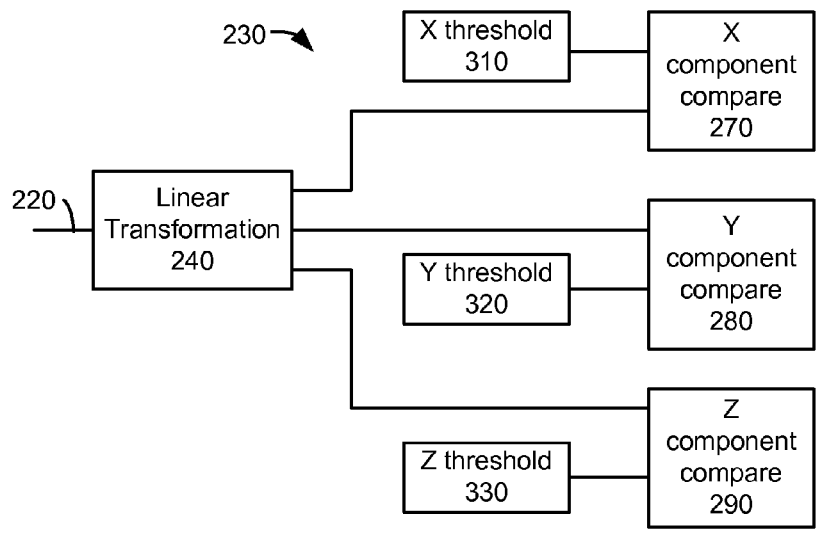
FIG. 11 is a block diagram of an orientation detection module of the data reader of FIGS. 1-6.

The microprocessor 52 includes an optional orientation detection module 230 that receives the signal 220 from the filters 210. The orientation detection module 230 is operable to determine the static orientation of the reader 10 based on the filtered x, y, and z vector components of the signal 220. The microprocessor 52 may use the orientation information provided by the orientation detection module 230 to select from among different operational functionalities as described below. FIG. 11 is a block diagram showing the orientation detection module 230 in greater detail. The orientation detection module 230 includes an optional linear transformation module 240 that is operable to adjust the x, y, and z vector components of the signal 220 to thereby compensate for yaw, pitch, and/or roll offsets relative to an ideal plane of the reader 10 when the reader 10 is in a stationary upright position. In other words, when a plane of the accelerometer 50 is offset from the ideal plane of the reader 10, the linear transformation module 240 performs one or more linear transformations in $R^3$ to replicate a situation in which the plane of the accelerometer 50 is aligned with the ideal plane of the reader 10. When the plane of the accelerometer 50 is aligned with the ideal plane of the reader 10, the orientation detection module 230 need not include the linear transformation module 240.

Figure 12:
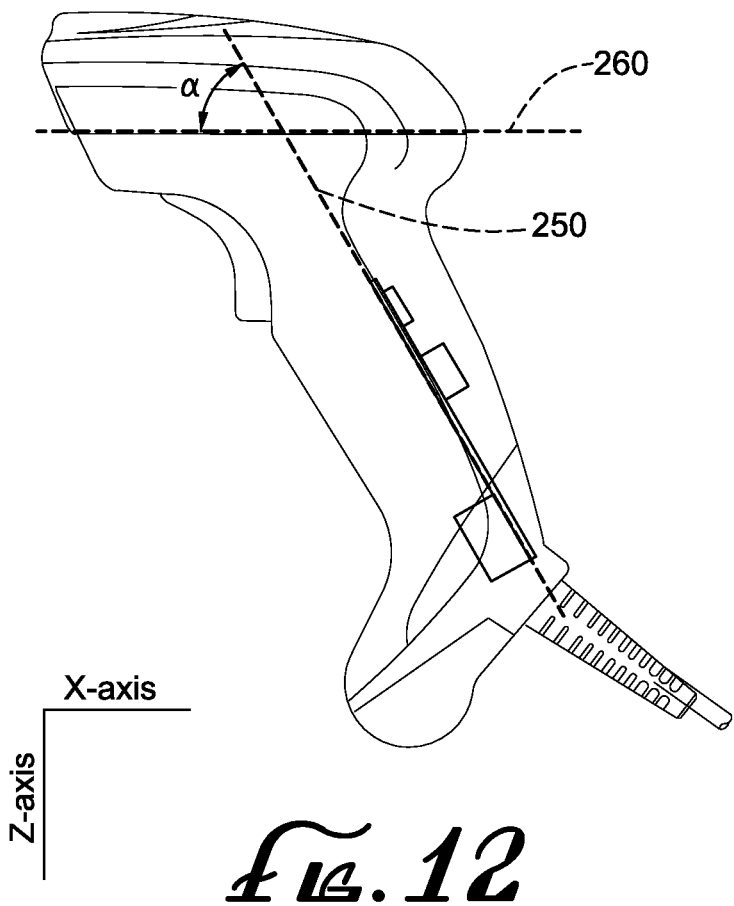
FIG. 12 is a left side elevation view of the data reader of FIG. 1 showing a plane of an accelerometer relative to an ideal plane of the data reader.
Figure 13:
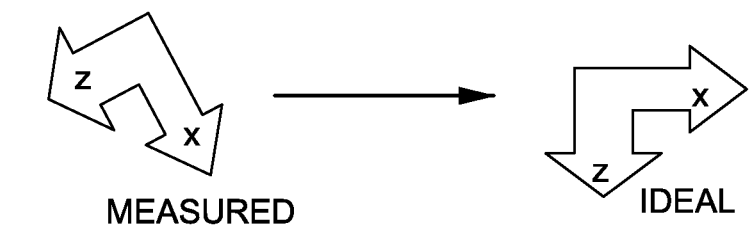
FIG. 13 is block diagram representing a transformation of measured x and z acceleration components to ideal x and z components.

FIG. 12 shows one example in which a plane 250 of the accelerometer 50 is offset from an ideal plane 260 of the reader 10 about the y axis by an angle α when the reader 10 is in a stationary upright position. In this example, the linear transformation module 240 transforms the measured x and z components of the signal 220 to represent a rotation about the y axis by a degrees to cancel out pitch error. FIG. 13 is a graphical representation of the transformation of the measured x and z components to ideal x and z components. The rotation about the y (pitch) axis may be represented by the following equations:

$$\begin{vmatrix} X \end{vmatrix}_{ideal} \quad \begin{vmatrix} X \end{vmatrix}_{measured} \\ \begin{vmatrix} Y \end{vmatrix}_{ideal} = A * \begin{vmatrix} Y \end{vmatrix}_{measured} \quad (1) \\ \begin{vmatrix} Z \end{vmatrix}_{ideal} \quad \begin{vmatrix} Z \end{vmatrix}_{measured}$$

where $$A = \begin{vmatrix} \cos\alpha & 0 & \sin\alpha \\ 0 & 1 & 0 \\ -\sin\alpha & 0 & \cos\alpha \end{vmatrix} \quad (2)$$

The elements of rotation matrix A may be multiplied by a selected value (e.g., 1024) to provide accuracy without floating point operations. Different rotation matrices may be used to provide rotation about the x (roll) axis and the z (yaw) axis if necessary. Below are examples of a rotation matrix $A_{x\text{-}axis}$ that may be used to provide a rotation of an angle γ about the x axis and a rotation matrix $A_{z\text{-}axis}$ that may be used to provide a rotation of an angle β about the z axis:

$$A_{z\text{-}axis} = \begin{vmatrix} 1 & 0 & 0 \\ 0 & \cos\gamma & -\sin\gamma \\ 0 & \sin\gamma & \cos\gamma \end{vmatrix} \quad (3)$$

$$A_{z\text{-}axis} = \begin{vmatrix} \cos\beta & -\sin\beta & 0 \\ \sin\beta & \cos\beta & 0 \\ 0 & 0 & 1 \end{vmatrix} \quad (4)$$

The orientation detection module 230 includes three comparison modules 270, 280, and 290 that compare the x, y, and z components adjusted by the linear transformation module 240 to static orientation thresholds 310, 320, and 330 to determine the orientation of the reader 10 when it is stationary. Alternatively, when the linear transformation module is not needed, the modules 270, 280, and 290 receive the x, y, and z components directly from the signal 220. The module 270 is operable to compare the x component to the x static orientation threshold 310, the module 280 is operable to compare the y component to the y static orientation threshold 320, and the module 290 is operable to compare the z component to the z static orientation threshold 330. Each of the thresholds 310, 320, and 330 may include a number of threshold levels to detect whether the reader 10 is oriented in one of several orientations. Each orientation may correspond to a different application or functionality of the reader 10. Moreover, each of the comparison modules 270, 280, and 290 may be capable of determining whether the corresponding component is greater than, less than, or equal to selected threshold levels. In one example, the threshold 310 may include a threshold value to which the x component is compared to determine whether the ideal plane 260 is pointed downwardly as represented in FIG. 5. In another example, the module 270 may compare the absolute value of the x component to the threshold 310 to determine whether the ideal plane 260 of the reader 10 is pointing in a vertical direction (up or down). In another example, the module 280 may compare the absolute value of the y component to the y threshold 320 to determine whether the reader 10 is lying on its side. In another example, the module 290 compares the z component to the z threshold 330 to determine whether the reader 10 is upside down or in a normal upright position as depicted in FIGS. 1 and 12. The x, y and z thresholds may be preset or user selectable via a suitable mechanism such as via programming labels or remote interface.

The microprocessor 52 may also include an optional stand coordinate detection module 340 that is operable to determine the x, y, and z acceleration components (i.e., coordinates) that correspond to a state when the reader 10 is stationary in the base 30 (also called a stand). Once the motion activity of the reader 10 is low for a selected amount of time, the module assumes the reader 10 is stationary and keeps track of the corresponding detected x, y, and z coordinates corresponding to the stationary position. The module 340 is self learning in that it can update the standard or expected stand coordinates representing the x, y, and z coordinates corresponding to a stationary position in the base 30.

Figure 14:
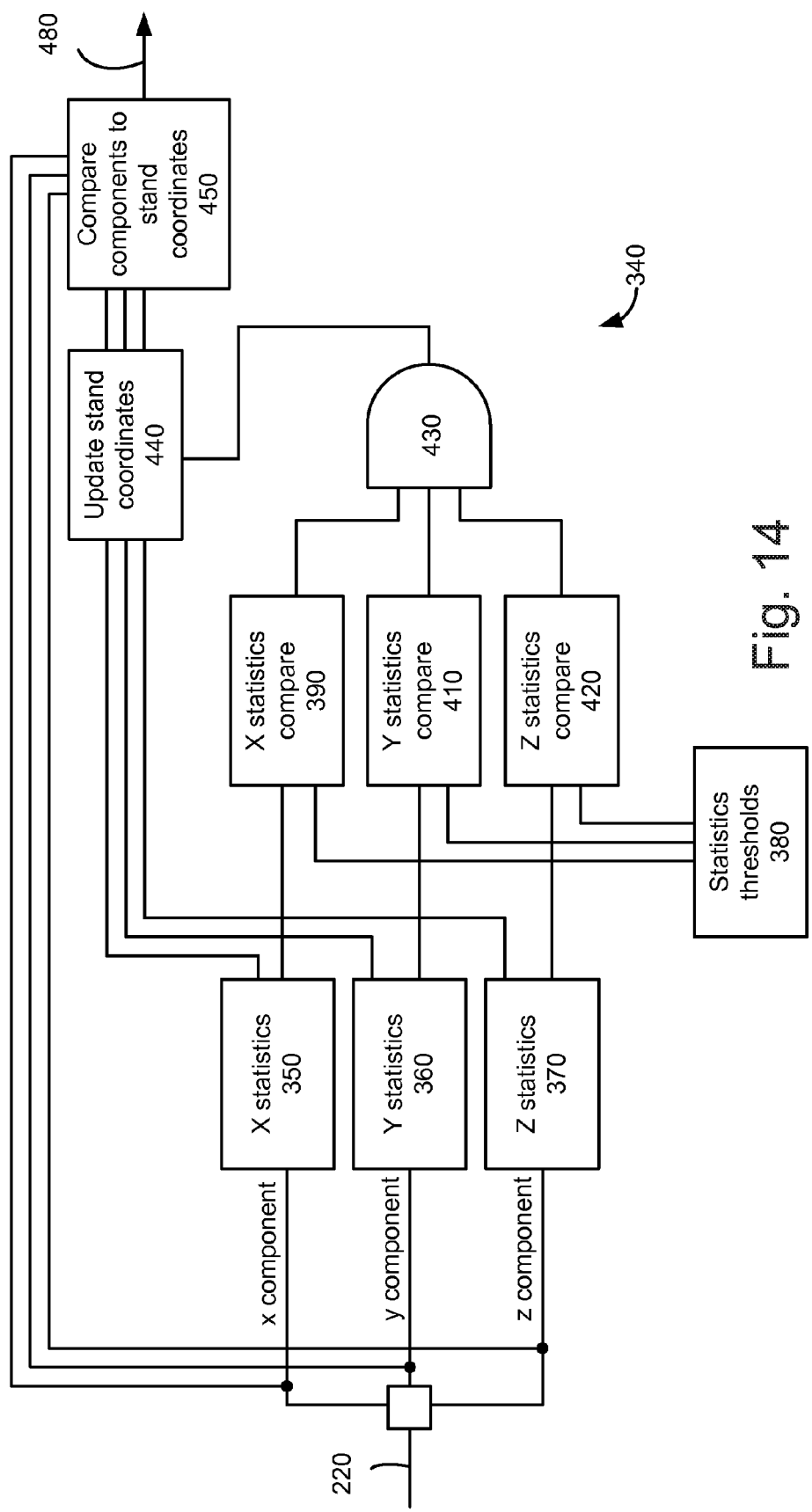
FIG. 14 is a block diagram of a stand coordinate detection module of the data reader of FIGS. 1-6.
Figure 15:
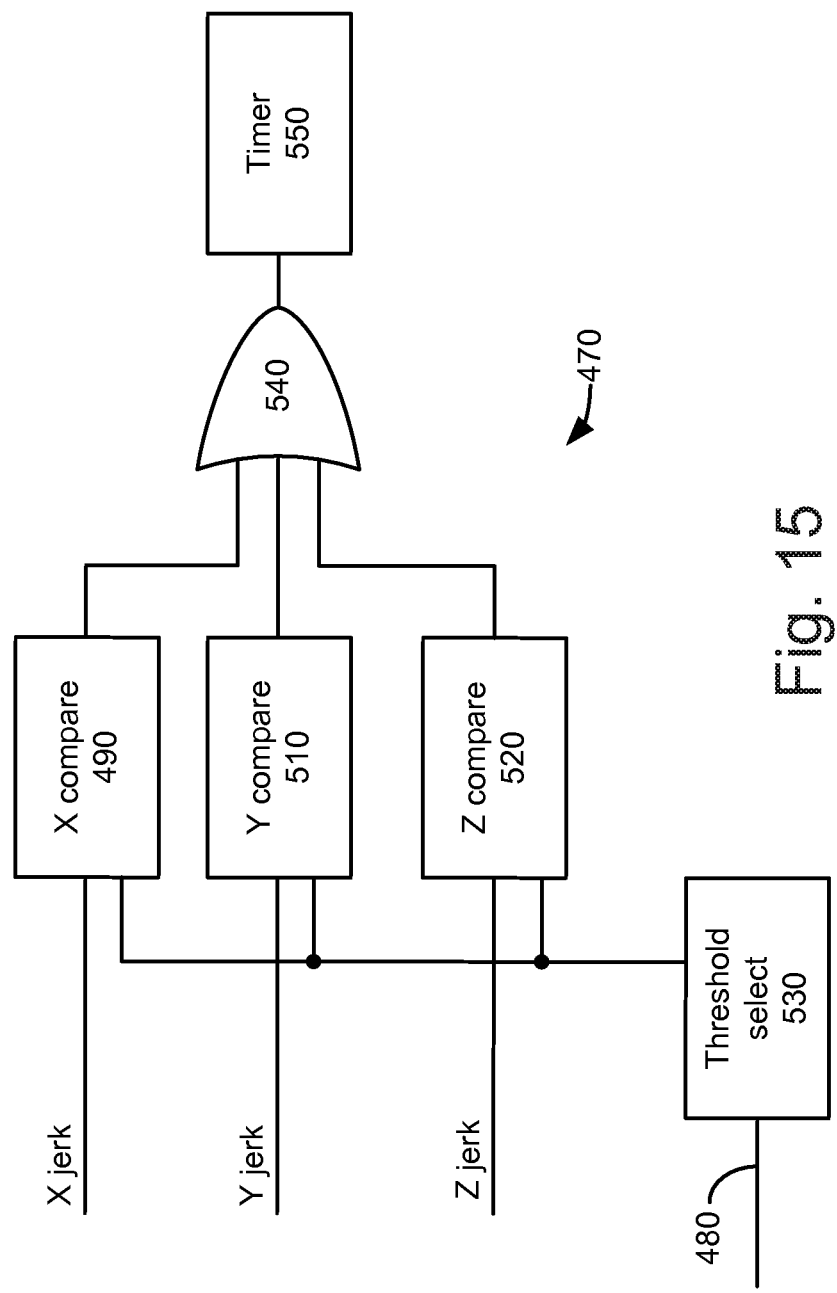
FIG. 15 is a block diagram of a motion detection module of the data reader of FIGS. 1-6.

FIG. 14 is a block diagram representing different submodules within the stand coordinate detection module 340. The module 340 includes statistics modules 350, 360, and 370 that receive, respectively, the x, y, and z components of the signal 220. The statistics modules 350, 360, and 370 are operable to determine various statistical values of the x, y, and z components such as the mean, standard deviation, and variance of a selected number of samples of the x, y, and z components. In one example, the modules 350, 360, and 370 calculate the statistical values based on 100 samples. The statistical values may be calculated based on more (or less) than 100 samples.

After the modules 350, 360, and 370 calculate the various statistics, statistics comparison modules 390, 410, and 420 compare one or more of the various statistics to x, y, and z statistics thresholds (represented by block 380). In one example, the variances of the x, y, and z samples are compared to the variance thresholds to determine whether the reader 10 is relatively stationary. When the variances of the x, y, and z samples fall below the variance thresholds, the stand coordinate detection module 340 assumes that the reader 10 is stationary in the base 30. Alternatively, the standard deviations of the x, y, and z samples may be compared to x, y, and z standard deviation thresholds. The orientation detection module 230 may be used in conjunction with the stand coordinate detection module 340 to verify whether the reader 10 is upright in the base 30, pointed downward in the base 30, lying on its side, or in another stationary orientation.

The outputs of the modules 390, 410, and 420 are supplied to an AND gate 430 that asserts its output when all of the modules 390, 410, and 420 determine that the x, y, and z statistics are below the statistics thresholds. When the AND gate 430 asserts its output, the output instructs an update stand coordinates module 440 to record as the stand coordinates the mean values of the x, y, and z components calculated by the modules 350, 360, and 370. Once the module 340 determines the stand coordinates, a comparison module 450 is operable to compare the current and subsequent x, y, and z components to the stand coordinates to determine whether the reader 10 is in the base 30. The comparison module 450 determines whether the differences between the current x, y, and z components and the stand coordinates are within an acceptable threshold range. If the differences are within the acceptable threshold range, the comparison module 450 confirms that the reader 10 is in the base 30.

The microprocessor 52 may also include one or more optional differentiators 460 that calculate the derivatives of the x, y, and z components of the signal 220. The differentiators 460 eliminate static gravitational components and provide an indication of the jerk, i.e., the first derivative of acceleration, for each of the x, y, and z acceleration components. The derivatives (or jerks) calculated by the differentiators 460 are supplied to an optional motion detection module 470 that determines whether the reader 10 is moving. The motion detection module 470 also receives a signal 480 from the stand coordinate detection module 340. The signal 480 is indicative of the determination made by the comparison module 450 as to whether the reader 10 is currently in the base 30.

The motion detection module 470 includes x, y, and z jerk comparison modules 490, 510, and 520 that are operable to compare the jerks of the x, y, and z components to one or more thresholds selected by a threshold selection module 530. The threshold selection module 530 selects between a relatively high threshold and a relatively low threshold based upon the signal 480 supplied from the stand coordinate detection module 340. For example, if the signal 480 indicates that the reader 10 is in the base 30, the threshold selection module 530 selects the relatively high threshold so that the motion detection module 470 is less sensitive to motion of the reader 10. Utilization of the relatively high threshold when the reader is in the base 30 allows the reader 10 to move slightly due to vibration, bumping, or other external forces (e.g., shaking of countertop 5) without the reader 10 erroneously switching to a handheld mode. When the signal 480 indicates that the reader 10 is not in the base 30, the relatively low threshold is selected thereby making the motion detection module 470 more sensitive to motion of the reader 10. The threshold value supplied to each of the modules 490, 510, and 520 may be the same as or different from the threshold values supplied to the other jerk comparison modules.

Each of the modules 490, 510, and 520 determines whether its corresponding x, y, or z jerk component exceeds the threshold value and sends a signal indicative of its determination to an OR gate 540. For example, each of the modules 490, 510, and 520 asserts its output when the corresponding x, y, or z jerk component exceeds the threshold value. The OR gate 540 supplies a signal to a timer module 550 that is operable to start or restart a countdown when one or more of the modules 490, 510, and 520 determines that the x, y, or z jerk component exceeds the threshold. The timer 550 may be used to switch between modes of operation. For example, when one or more of the modules 490, 510, and 520 first detects motion, the microprocessor 52 may switch from a handsfree mode to handheld mode. If at least one of the modules 490, 510, and 520 detects motion before the countdown expires, the timer module 550 restarts the countdown and the microprocessor 52 remains in handheld mode. If, however, the countdown expires without any of the modules 490, 510, and 520 detecting motion, the microprocessor 52 switches to handsfree mode.

The reader 10, including the accelerometer 50 and controller or microprocessor 52, are provided or programmed with a multitude of special functions, modes or capabilities some of which are described in the following. The functions, modes or capabilities utilize one or more of the modules of the microprocessor 52 described above. These functionalities may be pre-programmed into a memory contained within or otherwise connected to the microprocessor 52, or downloaded from a suitable source such as the host, a programming unit, or via a network interface such as the internet. For the purposes of this description, the terms fixed mode and handsfree mode will be used interchangeably.

Wake-up: In normal handsfree operation (the handsfree operating mode), the unit 10 will be stationary and the accelerometer 50 will detect no motion. If the unit is in a sleep or power-save mode, the unit may wake-up in response to moving, touching, tapping, or shaking of the housing 12. The accelerometer 50 sensing the tap, signals the controller 52, which in turn activates the reader for fixed mode of operation. Skilled persons will recognize that the differentiators 460 and motion detection module 470 may be used to detect moving, touching, tapping, or shaking motion to wake-up the unit.

It is noted throughout this description that various possible/preferred operating modes will be described, and in some cases alternate operating modes. For example, the above wake-up scenario may be actuated in response to either a touch, motion detection, tap or shake. It is likely that a particular unit will not be programmed to all of these possible actions for wakeup, but only one or a select few of the actions.

Operating in handsfree mode: Once awake, the unit 10 can sense, via the accelerometer 50, that it is not moving and commence operating in the handsfree mode, for example, reading optical codes with a wide, omnidirectional reading pattern. The reader 10 may be programmed to sense a particular type of motion, distinguishing between pivoting, tapping or temporary shaking motion that signifies wakeup, but remain in handsfree mode, whereas one of the other motions may serve to actuate to another function. In other words, when the unit is pivoted from the vertical position (of FIG. 1) to the tilted down position of FIG. 5, the accelerometer will sense motion of the unit (via the motion detection module 470), as well as changed angular orientation (via the orientation detection module 230). Sensing that the motion and angular orientation is primarily orientation change (and the motion quickly ceased), the unit remains in the handsfree mode, switching from the handsfree vertical orientation mode (with for example an omnidirectional wide field of view reading pattern) to the handsfree downward orientation mode (with for example a higher density, narrow field of view).

Switching between handsfree and handheld modes: If the operator lifts the unit 10, the accelerometer 50 detects motion (via the motion detection module 470), and the reader 10 is switched from the handsfree mode of operation to the handheld mode of operation. In the handheld mode of operation, the reader may automatically generate (before trigger pull) an aiming pattern for assisting the operator to aim the reader as the reader may read with a narrower, read zone. Alternately, the aiming beam may be activated by operation of the trigger 20, and then by continuing to hold the trigger, the data reading process could be actuated. Alternately, the trigger 20 may be a two-position trigger, in the first position activating the aiming beam, and the second position activating reading.

A proximity sensor may also be used as an alternative to the accelerometer 50 to detect when the reader 10 is being held by a hand, and determine if the reader 10 should be operating in handsfree mode or handheld mode. The proximity sensor could also be used in conjunction with the accelerometer to further distinguish if the unit is to operate in handheld or fixed mode. If a hand is not detected by the proximity sensor then the reader 10 can react differently to signals from the accelerometer 50 than it would when a hand is sensed. Any known proximity sensor may be used. For example, the proximity sensor may rely on electromagnetic or electrostatic radiation to determine whether an object (e.g., a user's hand) is near the hand grip section 14.

Operating in handheld modes: In one preferred operation, once motion is detected by the accelerometer (or by the detector sensing grasping of the housing), the reader automatically switches to handheld mode turning on the aiming beam even before actuation of the trigger 20, allowing the user to more rapidly aim the reader, the user aiming the reader by orienting the reader housing so as to place the aiming beam on the desired barcode to be read, and then via actuation of the trigger, the reader will read (sense/acquire and process/decode) the barcode, acknowledging a successful read and transmitting data to a host. Particularly applicable for an imaging reader, the reader may commence reading of codes even before the trigger is actuated (reading having been commenced in response to motion being sensed), possibly processing image frames captured/acquired close in time before the trigger is actuated. Image frames are captured and processed for barcodes but preferably barcode read is not acknowledged (no audible beep) and acquired data is not yet transferred to the host.

It is noted that there is a tendency for an operator to misaim the scanner due to motion of squeezing the trigger, thus processing an image frame preceding trigger pull may provide a better aimed read. Where the reader is reading (sensing and decoding codes) prior to trigger pull, a more accurate aiming position may have actually occurred prior to trigger pull (e.g. within 1/10 second) or in the case of the two-stage trigger, just prior to the second stage trigger pull. The optical code read just prior to trigger pull may be the code selected and acknowledged. Alternately the optical code read just prior to trigger pull may be compared to the code read upon trigger pull and the code acknowledged only if they are the same thus providing confirmation.

In another embodiment, a data reader is constructed and arranged for operation in a handheld mode of reading operation and for operation in a fixed mode of operation, comprising a housing; a manually-actuable trigger; a printed circuit board (PCB) disposed in the housing; a timer; an inertial sensor mounted within or on the housing and operative for sensing motion, including non-motion, of the data reader, wherein the data reader is operative to progressively switch from handheld mode to progressively lower power state operating modes in response to sensing non-motion of the data reader for given time intervals as set by the timer.

In one configuration, a data reader includes
a housing constructed and arranged for operation in (a) a handheld mode of reading operation and (b) fixed or hands-free mode of reading operation, the housing including a printed circuit board (PCB) disposed in the housing and a manually-actuable trigger, the PCB including an inertial sensor integrated therewith or mounted thereon and operative for sensing motion of the data reader;

wherein in the handheld mode of operation the data reader is operative to commence decoding optical codes prior to actuation of the trigger, whereby upon actuation of the trigger, a selected optical code (for example out of a plurality of optical codes disposed on a pick sheet) is acknowledged and/or reported.

Alternately, it may be noted that the motion of the reader may decelerate as the aiming pattern is settled onto the desired optical code, and the accelerometer 50 can detect this deceleration and in response commence reading (sensing and decoding) of codes assuming that the deceleration indicates impending trigger pull. Alternately, in a triggerless operation, the reader 10 may sound an audible signal, such as a tone distinct from the "good read" beep sound, indicating that the reader is focused/aimed on a single barcode. In another example, the reader may indicate, prior to trigger pull, that an optical code has be decoded by highlighting (e.g., illuminating) the region in the field of view where the decoded symbol is located and then transmitting the decoded information when the trigger 20 is pulled. Other methods for using an imager to select a single code out of several codes in a read zone may be employed, such as those disclosed in US 2006/0081712 hereby incorporated by reference.

In one embodiment, the user may be seeking to read a single optical code out of several codes in the read zone. The accelerometer detects the motion and the settling onto one particular code, the reader sounding an audible alert that the aiming pattern is centered on a single code, or that only a single code is now in the read zone. Upon hearing the audible signal, the user knows that the one barcode would be read, then whereupon actuation of trigger, the one barcode is read and data sent to the host, typically accompanied/acknowledged by the good read audible beep.

Figure 16:
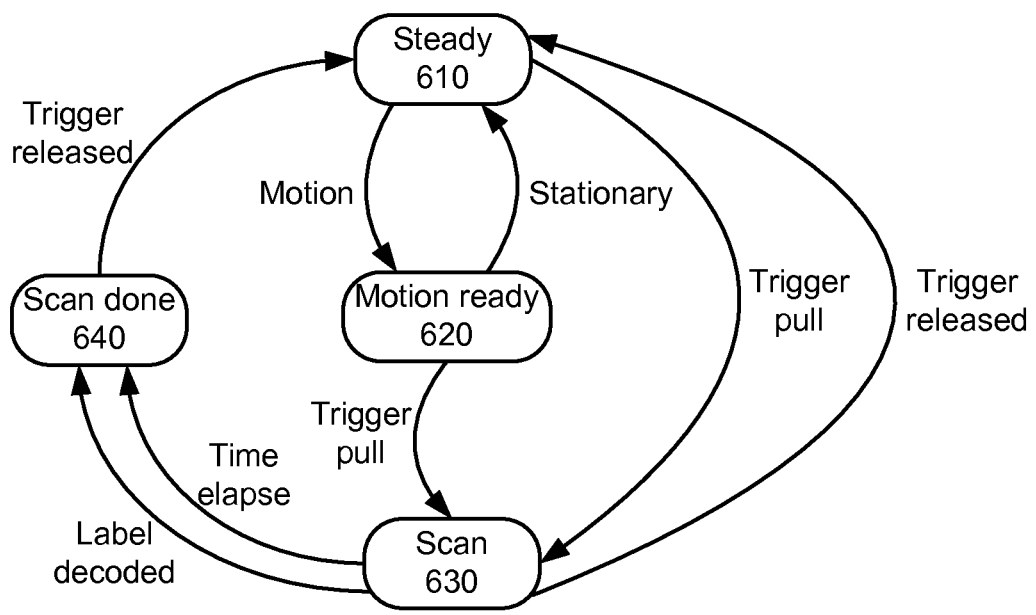
FIGS. 16 and 17 are state diagrams representing different operational states of the data reader of FIGS. 1-6.

FIG. 16 is a state diagram of one embodiment of the reader 10 in which the reader 10 attempts to read a barcode label based on a trigger pull. The transitions between various states are keyed off of motion and/or trigger pulls. A steady state 610 corresponds to the reader 10 being stationary (e.g., resting in base 30). The steady state 610 may correspond to sleep mode for example. In the steady state 610, various functions of the reader 10 may be turned off to conserve energy. For example, the aiming pattern, an illuminator, and/or a decoder of the reader 10 may be turned off. Additionally, the microprocessor 52 may operate at a relatively low processing speed. When the motion detection module 470 detects that the reader 10 is moving, the reader 10 transitions to a motion ready state 620. The reader 10 may stay in the motion ready state 620 as long as the accelerometer 50 and the motion detection module 470 detect that the reader 10 is moving and the trigger 20 of the reader 10 has not been pulled or otherwise activated. If the motion detection module 470 detect that the reader 10 is stationary, the reader 10 transitions back to the steady state 610. In the motion ready state 620, certain functions may be turned on. For example, the aiming pattern may be turned on to assist the user to aim the reader 10 at a barcode, and the microprocessor 52 may operate at a relatively high speed. However, other functions may remain off. For example, the illuminator and the decoder may remain off.

The reader 10 transitions from the motion ready state 620 to a scan state 630 when the trigger 20 of the reader 10 is activated. The reader 10 may also transition directly from the steady state 610 to the scan state 630 when the trigger 20 is activated. The reader 10 stays in the scan state 630 as long as the trigger 20 is activated, a timer has not elapsed (the timer being optional), and the reader 10 has not decoded a barcode label. In the scan state 630, various functions may be activated or remain on. For example, the microprocessor 52 may operate at the relatively high processing speed, the aiming pattern may be on, the illuminator and the decoder may be turned on, and a timer (e.g., an elapse timer) may be started. If the trigger 20 is released before (a) the reader 10 decodes a barcode and (b) the timer elapses, the reader 10 transitions to the steady state 610. If the trigger 20 remains activated and the timer expires, the reader 10 transitions from the scan state 630 to a scan done state 640. The reader 10 also transitions from the scan state 630 to the scan done state 640 when the reader 10 successfully decodes a barcode label. When barcode label is successfully decoded, in addition to emitting the audible "beep" signal, the reader 10 may also provide a visual signal such as (a) an indicator light disposed on the reader housing or (b) turning on a light that forms a colored spot (e.g., a green spot) in the field of view (e.g., on the barcode that has been read) to signal to the user that the barcode label was successfully decoded. For example, the colored spot may be formed in the center of the aiming pattern. The colored spot may be in place of or in addition to or combination with the audible alert to indicate a successful read, the colored spot being particularly useful in locations having high ambient noise levels. In the scan done state 640, various functions may be off. For example, the aiming pattern, illuminator, and decoder may be turned off as well as the colored spot if it was previously turned on. The microprocessor 52 may also transition to the relatively low processing speed. The reader 10 transitions from the scan done state 640 to the steady state 610 when the trigger 20 is released or otherwise deactivated.

Shake detection: The accelerometer 50 can also detect shaking of the unit. Once lifted, the reader 10 senses the motion and switches to handheld mode. If the operator shakes the unit, the accelerometer 50 and motion detection module 470 can detect the shaking motion (which is a motion distinct from simple moving the reader) and in response to detecting the shaking motion, activate one or more functions such as turning on the aiming beam or entering a different operating mode. The reading function may automatically follow, or the reading function may be activated by a pull of the trigger 20 or a second shake. Other functions operable via shake detection include: (a) clearing a memory buffer, (b) entering image capture mode, (c) waking up an RF transceiver and initiating a connection with a host transceiver, (d) changing the focus/depth-of-field of the reader 10, (e) indicating the end of a transaction, (f) toggling between ambient light reading and illuminated reading, (g) toggling between an omnidirectional mode to a narrow imaging mode for pick lists, (h) transmitting accumulated data, (i) change menus on a display of the reader 10, (j) clear or restart a transaction in process, and (k) toggling between imaging and decoding modes.

Orientation detection: Where the accelerometer 50 is equipped with orientation detection (via orientation detection module 230), the reader 10 can determine whether the reader is in various positions. Some of these orientation functionalities are described in the following.

(a) When stationary, the unit can detect whether the unit is upright as in FIG. 1 or pointed downwardly as in FIG. 5. The unit may be operated in different handsfree modes depending on reader orientation. For example, when detected in the upright position of FIG. 1, the data reader may be operational optimized (such as with a lower density omnidirectional read pattern) for reading 1D barcodes on items presented in the scan field; when detected in the downwardly facing angular orientation (as in FIG. 5), the reader may be optimized or switched to a 2D code, such as with a higher density imaging reading mode expecting to read a 2D code, or an image capture of a driver's license or a personal check.

(b) After being used in the handheld mode, the reader may be placed back on its base or on the counter awaiting further use in the fixed mode. The accelerometer detects that the unit is not moving, the controller preferably employing some hysteresis/delay in switching from the handheld mode to the handsfree mode to ensure that return to handsfree mode is appropriate. It is possible that the reader might be laid on its side (any one of its sides), or suspended (or dangling) by its cord and not upright on the base 30 (upright typically, but not necessarily being the normal operating orientation when in the fixed mode), but the accelerometer can detect the improper orientation (e.g., non-vertical or otherwise in non-normal orientation) and summon an alternate operation such as (1) shutting down the unit (i.e., moving quickly to sleep mode); (2) sounding an audible alert/alarm or providing some other signal for thus notifying the operator that the unit has not been properly set down; (3) if the base unit was equipped with a wireless charging coil, using the accelerometer to detect that the unit is not properly set down on the base tray unit and then not activating the in-tray charging functions.

(c) In another method using orientation detection, the system uses the accelerometer to detect vector coordinates of housing. By monitoring the orientation of the unit over time, if successive samples of orientation detections are determine to be approximately the same, then it is assumed that the data reader is stationary and thus determined to switch to the fixed mode of operation. If successive samples indicate that the orientations of the reader are different by a suitable margin (e.g., by comparing the jerks of the x, y, and z components to the selected threshold) then it is assumed that the data reader is moving and the data reader is switched to the handheld mode of operation.

Tap mode: The accelerometer 50 may also have the capability of detecting when the housing is tapped by the user, whereby the user takes a single finger or two and raps lightly on the head 16 of the reader housing 12. The accelerometer 50 detects the tap, and if enable with the tapping mode, toggles through a series of functional commands switching from/between any one of a number of functions (and in any desirable order) such as: data reading in handheld mode; data reading in narrow beam mode with aiming beam (to select one barcode out of several such as on a pick sheet); data reading in wide area, omnidirectional mode; activate display 17 on housing; volume control mode; turning aiming beam/pattern on or off; activate RFID reading (for example in the case that the reader is a combined optical code reader and RFID reader); activating the electronic article surveillance (EAS) deactivator (where the unit is equipped with an EAS deactivator) or entering/exiting image capture mode.

The above-described functions/modes, through which the reader may switch or cycle in response to an input from the operator, are example modes of operation. A given reader may be equipped to provide any suitable combination of these functions as well as other functions. Similarly, the reader may cycle or switch between these modes in response to shaking or tapping the unit as previously described.

In an added feature, the data reader may switch as between various operational characteristics depending upon motion and/or orientation detected by the accelerometer. Sensing either or both the movement and the orientation of the data reader, the performance of the reader may be actively altered based on this information. Other functions that may be activated or adjusted include the following:

Actively changing the focal length or resolution of the reader.

Changing or otherwise selecting which symbologies are enabled.

Changing order of symbology decoders.

Selecting illumination intensity or type.

Enabling data collection and processing/decoding, but delaying transmission/acknowledgment until trigger pull. Typically, reading (sensing and decoding) and illumination commences upon trigger pull. Rather than waiting for the trigger pull for reading to commence, the reader already may start reading attempts once handheld mode is entered due to detection of movement. Where the reader is an imaging optical code reader, ambient light may be sufficient for optical code reading, and the reader could already have successfully read the bar code without illumination prior to trigger pull thereby speeding operation.

Changing the Automatic Exposure Control (AEC) algorithm.

The reader may enter sleep mode if it is stationary and has not read a ID tag in a certain period of time. A low power state, power down or sleep timer can be initiated in response to state of motion. For example, if while in the handheld mode it is detected that the reader is no longer in motion, the accelerometer can detect this non-moving state and in response (after a certain period of time), switch to either fixed mode or to sleep or power down mode. In the non-moving state, the reader may cycle to progressively lower power states based on the timer (i.e., how long the reader is detected as non-moving. The detection of motion by the accelerometer can operate as a wake-up event to signal the reader to initialize and turn on without waiting for trigger pull. In the case of a reader having an RF link, it may start to initialize its radio link to its base.

Use motion direction and magnitude to help with stitching of subsequent scans of data.

Log magnitude, direction and duration of motion to better understand operating environment and use of the reader. One example may be a warehouse application where the operator is reading higher density codes from a pick list or other paper work, and also reading shelf tags. While reading from the pick list, the reader will likely be pointed downward and the reader can detect this orientation and automatically adjust the reading mode for a more narrow field of view, shorter distance focus read. Other functions selected may include: select or prioritize the focal length for shorter depth of field and higher density codes; select or prioritize the decoder for the symbology used on the pick list; lower the illumination for reading these closer codes thus saving power; prioritize the AEC algorithm for reading at close range with the internal illumination dominating; select or prioritize filters for reading at close range with good illumination, and for low speed motion (if such low speed motion is detected).

When reading shelf tags, the reader is pointed more horizontally or upwardly and the reader may detect this orientation and automatically select a longer focus distance and possibly a wider field of view. Other functions that may be selected based on this upward orientation may include:

Select or prioritize the focal length for reading greater DOF and lower density codes;

Select or prioritize the decoder algorithm for the symbology used on shelf tags;

Increase the illumination intensity for reading codes at greater distances from the scanner;

Prioritize the Automatic Exposure Control (AEC) algorithm for reading at far range with lower levels of illumination expected due to longer distance reading;

Select or prioritize filters for reading at far range with lower illumination, and for higher motion, the direction of motion could be used to select a filter to compensate for the motion detected; increase trigger time out;

Start the scan with an aiming beam, possible an aiming beam suitable for long distance.

Figure 17:
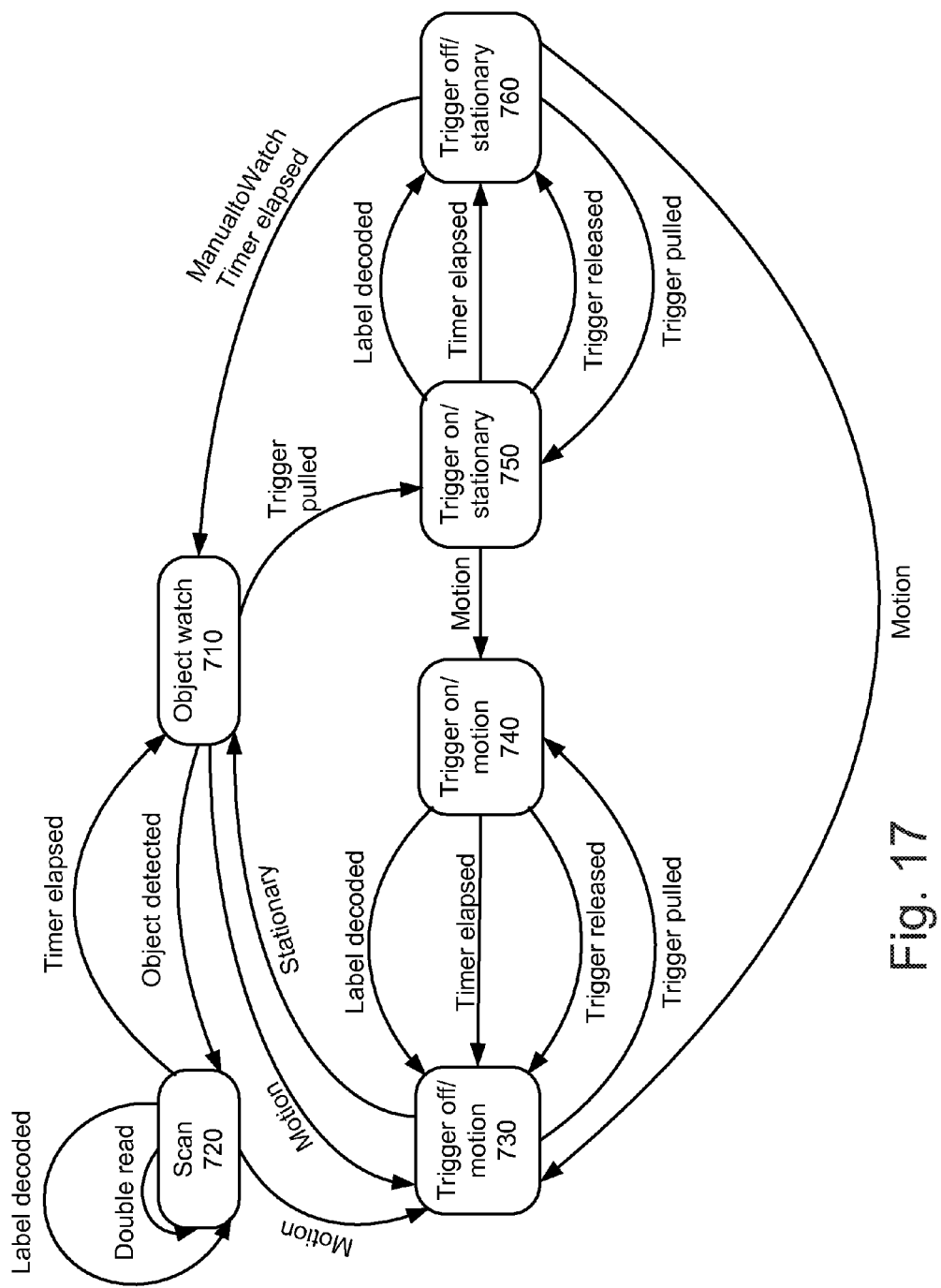

The following is an example of various states, functions, and operations that may be implemented by the reader 10. FIG. 17 is a state diagram representing different states and modes of operation for the reader 10. FIG. 17 includes representations of three modes: a handsfree automatic decode mode (an object watch state 710 and a scan state 720), a handheld mode (trigger off/motion state 730 and a trigger on/motion state 740), and a stationary trigger activation mode (a trigger on/stationary state 750 and a trigger off/stationary state 760).

Handsfree automatic decode mode. The handsfree automatic decode mode may be implemented when the reader 10 is resting in the base 30. In the object watch state 710, an object detection feature is activated in which the reader 10 monitors its field of view to detect whether an object comes within it. In one example, the reader 10 detects movement or changes within the field of view. Skilled persons will recognize that many different techniques (e.g., measuring optical and/or acoustic changes) may be used to detect objects within a field of view. In the object watch state 710, other features may be activated. For example, an aiming pattern may be turned on to assist the user in placing a barcode label within the reader's field of view. The reader 10 may include an LED indicator that flashes when the reader 10 is in the object watch state 710 to signify that the reader 10 is ready to read a label. In addition, a decoder of the reader 10 may be turned off in the object watch state 710.

When the reader 10 detects that an object is within the field of view, the reader 10 transitions from the object watch state 710 to the scan state 720. In the scan state 720, the object detection feature is turned off, an illuminator may be turned on to illuminate the field of view, and the decoder is turned on to decode a barcode label (if any) in the field of view. The reader 10 may include a suitable double read timeout feature, such as described in U.S. Pat. No. 6,698,658 or U.S. Appl. No. 2010/0123005 hereby incorporated by reference, to decrease the chances of an erroneous read. If the reader 10 successfully decodes a barcode label, the reader 10 may activate the light to form the color spot (discussed above with reference to FIG. 16) in the aiming pattern of the reader 10 and/or the reader 10 may sound an audible alert to indicate that the label has been successfully decoded. When the reader 10 enters the scan state 720, an object timer is started. Once the object timer elapses, the reader 10 transitions back to the object watch state 710 regardless of whether a label has been decoded. The object timer is reset once the reader 10 transitions from the scan state 720 to the object watch state 710.

Handheld mode. The reader 10 may transition to the handheld mode from either the object watch state 710 or the scan state 720. For example, if the reader is in the object watch state 710 or the scan state 720 and the motion detection module 470 detects that the reader 10 has been picked up, the reader 10 transitions to the trigger off/motion state 730 in which the reader 10 waits for a trigger pull from the user. In the trigger off/motion state 730, the object detection feature, illuminator, decoder, and aiming pattern may be turned off. If the motion detection module 470 detects that the reader is stationary, the reader 10 transitions back to the object watch state 710. The reader 10 may pause or delay for a selected time period (for example several seconds) before transitioning from the trigger off/motion state 730 to the object watch state 710. This time period may be preset or user-selectable via a suitable mechanism such as programming labels or remote interface or the like.

The reader 10 transitions from the trigger off/motion state 730 to a trigger on/motion state 740 when the trigger 20 is pulled or otherwise activated. In the trigger on/motion state 740, the object detection feature remains off and the illuminator, decoder, and aiming pattern are turned on to thereby attempt to decode a barcode label. A timer is also started once the reader is in the trigger on/motion state 740. If the timer elapses before (a) the trigger 20 is released and (b) the decoder decodes a barcode label, the reader 10 transitions back to the trigger off/motion state 730 and the timer is stopped and reset. If the trigger 20 is released before (a) the timer elapses and (b) a barcode label is decoded, the reader 10 transitions back to the trigger off/motion state 730. Additionally, if the decoder decodes a barcode label before (a) the timer elapses and (b) the trigger 20 is released, the reader 10 transitions back to the trigger off/motion state 730 and indicates that the barcode label has been successfully decoded. For example, the light that forms the colored spot within the aiming pattern may be turned on and/or the reader 10 may send an audible alert indicating a successful read.

Stationary trigger activation mode. The reader 10 transitions from the object watch state 710 to the stationary trigger activation mode (states 750 and 760) when the reader 10 is stationary and a user pulls or otherwise activates the trigger 20. When the trigger 20 is pulled, the reader 10 enters the trigger on/stationary state 750 in which the reader 10 attempts to decode a barcode label (if any). In the trigger on/stationary state 750, the object detection feature is turned off and the illuminator, decoder, and aiming pattern are turned on. If the motion detection module 470 detect that the reader has been picked up when the reader is in the trigger on/stationary state 750, the reader transitions to the trigger on/motion state 740.

Once the reader 10 enters the trigger on/stationary state 750, a timer starts. If the timer elapses before (a) the trigger 20 is released and (b) the decoder decodes a barcode label, the reader 10 transitions to the trigger off/stationary state 760. If the trigger 20 is released before (a) the timer elapses and (b) a barcode label is decoded, the reader 10 transitions to the trigger off/stationary state 760. Additionally, if the decoder decodes a barcode label before (a) the timer elapses and (b) the trigger 20 is released, the reader 10 transitions to the trigger off/stationary state 760 and indicates that the barcode label has been successfully decoded. For example, the light that forms a colored spot within the aiming pattern may be turned on and/or the reader 10 may send an audible alert indicating a successful read.

In the trigger off/stationary state 760, the timer initiated in the trigger on/stationary state 750 is stopped and a new ManualtoWatch timer is started. The ManualtoWatch timer introduces a delay for the reader 10 before it transitions back to the object watch state 710. If the ManualtoWatch timer elapses before (a) the trigger 20 is pulled and (b) the reader 10 is picked up, the reader 10 transitions back to the object watch state 710. In the trigger off/stationary state 750, the illuminator, decoder, and aiming pattern are turned off and the object detection feature remains off. If the trigger 20 is pulled before (a) the ManualtoWatch timer elapses and (b) the reader 10 is picked up, the reader 10 transitions back to the trigger on/stationary state 750 and the ManualtoWatch timer is stopped and reset. If the motion detection module 470 detect that the reader 10 has been picked up before (a) the ManualtoWatch timer has elapsed and (b) the trigger 20 has been pulled, the reader transitions from the trigger off/stationary state 760 to the trigger off/motion state 730.

As previously described above in conjunction with FIGS. 1-6, the reader 10 may include a cable 13 (connected to either the housing 12 or to the base 30) for providing power and communication link. Alternately, the reader may be constructed in a cordless configuration, communicating wirelessly with the host. In one configuration as may be described in relation to FIGS. 7-9, the portable portion of housing section 112 and base 130 communicate wirelessly with the host or other controller. The base tray 160 is connected by a power cord 113 to a power source. The handheld unit 112/130 includes a battery 170 (shown schematically in FIG. 7). The battery 170 may be located in any suitable location either in the housing 112 or the base section 130. Power is preferably transferred wirelessly from the tray unit 113 to the base 130 via transmission from induction transmission coil 162 in the tray unit 160 to the induction receiving coil 131 in the base 130 thus requiring no physical electrical contact between the base section 130 and the tray unit 160. Alternately, the unit 160 may include electrical contacts 172, 174 (instead of the rubber feet as in FIG. 1) for providing electrical connection between the base 130 and the tray 160.

While certain preferred systems and methods have been shown and described, it will be apparent to one skilled in the art that modifications, alternatives and variations are possible without departing from the inventive concepts set forth herein. Therefore, the invention is intended to embrace all such modifications, alternatives and variations.

The invention claimed is:

1. A data reader comprising
a housing;
a manually-actuable trigger;
a printed circuit board (PCB) disposed in the housing;
an inertial sensor mounted within or on the housing and operative for sensing motion of the data reader,
wherein the data reader is operative to enter a handheld mode of operation upon the inertial sensor sensing motion of the data reader, and in the handheld mode the data reader is operative to (1) commence sensing and decoding of codes prior to actuation of the trigger, and (2) upon actuation of the trigger, acknowledge and/or report a selected code that was acquired just prior in time to the actuation of the trigger.

2. A data reader according to claim 1 wherein the data reader commences sensing and decoding of codes upon sensing by the inertial sensor of deceleration in movement of the data reader, whereby the deceleration indicates impending trigger pull.

3. A data reader according to claim 2 wherein the data reader operating in the handheld mode is operative to switch to a sleep or lower state power mode in response to detection by the inertial sensor of the data reader being in a non-moving state for a given period of time.

4. A data reader according to claim 1 further comprising an illumination system disposed in or on the housing for illuminating an object being read, wherein illumination intensity of the illumination system is changed in response to input from the inertial sensor.

5. A data reader according to claim 1 further comprising an illumination system disposed in or on the housing for illuminating an object being read, wherein the data reader is operative, (1) upon detection of motion, to attempt reading an object without illumination prior to actuation of the trigger, and (2) upon actuation of the trigger, to illuminate the object with the illumination system to attempt reading an object with illumination.

6. A data reader according to claim 1 the data reader includes an automatic exposure control algorithm that is changed in response to input from the inertial sensor.

7. A data reader comprising
a housing;
a base or stand for holding the data reader housing in an angular position for the fixed mode of operation and in a standard expected;
an inertial sensor mounted within or on the housing and operative for sensing motion of the data reader,
an angular orientation module mounted within or on the housing and operative for sensing angular position of the data reader, wherein the angular orientation module is operative for determining that the data reader is in a supported position for a fixed mode of operation based upon the angular position being sensed as unchanged for one of (a) a given amount of time or (2) a given number of orientation detections.

8. A data reader according to claim 7 wherein the angular orientation module is operative to monitor angular orientations of the data reader being detected corresponding to the supported position for the fixed mode of operation.

9. A data reader according to claim 8 wherein the angular orientation module comprises a stand coordinate detection module operative for learning an angular orientation corresponding to the supported position held by the base or stand, wherein the stand coordinate detection module is operative to update stand coordinates representing x, y, and z coordinates corresponding to a stationary position in the base or stand.

10. A data reader according to claim 8 wherein the angular orientation module is operative to calculate a statistical model based upon a sampling of a plurality of detected angular positions of the data reader being detected corresponding to the supported position for the fixed mode of operation and establish a variance threshold to determine whether the data reader is relatively stationary.

11. A data reader according to claim 8 wherein the variance threshold is set via one threshold selected from the group consisting of (a) preset value or (b) adjustable via user selection.

12. A data reader comprising
a housing;
a printed circuit board (PCB) disposed in the housing;
an optical system for acquiring an image of a target or object in a read zone;
a focusing mechanism for setting a focal length or resolution for the optical system;
an inertial sensor mounted within or on the housing and operative for sensing motion of the data reader,
wherein the focusing mechanism is operative to change the focal length or resolution of the focusing mechanism based on motion being sensed by the inertial sensor.

13. A data reader according to claim 12 further comprising a manually-actuable trigger, wherein the focusing mechanism is operative to commence changing the focal length of the focusing mechanism prior to actuation of the trigger.

* * * * *

UNITED STATES PATENT AND TRADEMARK OFFICE
CERTIFICATE OF CORRECTION

Page 1 of 1

PATENT NO. : 9,087,251 B2
APPLICATION NO. : 13/973903
DATED : July 21, 2015
INVENTOR(S) : Thomas E. Tamburrini et al.

It is certified that error appears in the above-identified patent and that said Letters Patent is hereby corrected as shown below:

In the specification

Column 4
Line 37, change "including (a)" to --including:--.
Line 39, before "the foot" insert --in--.

Column 6
Line 67, before "degrees" change "a" to --α--.

Column 11
Line 64, change "be" to --been--.

Column 12
Line 31, change "detect" to --detects--.

Column 13
Line 14, after "simple" insert --of--.

Column 14
Line 6, change "determine" to --determined--.
Line 19, change "enable" to --enabled--.
Line 57, change "commences" to --commence--.

Column 15
Line 2, after "read" change "a" to --an--.

Column 17
Line 21, change "detect" to --detects--.
Line 52, change "detect" to --detects--.

Signed and Sealed this
Twenty-third Day of February, 2016

Michelle K. Lee
*Director of the United States Patent and Trademark Office*